United States Patent [19]

Duerig et al.

[11] Patent Number: 4,806,755

[45] Date of Patent: Feb. 21, 1989

[54] MICROMECHANICAL ATOMIC FORCE SENSOR HEAD

[75] Inventors: Urs T. Duerig, Rüschlikon; James K. Gimewski, Zürich, both of Switzerland; Johann Greschner, Pliezhausen, Fed. Rep. of Germany; Wolfgang D. Pohl, Adliswil, Switzerland; Olaf Wolter, Schoenaich, Fed. Rep. of Germany

[73] Assignee: International Business Machines Corporation, Armonk, N.Y.

[21] Appl. No.: 103,993

[22] Filed: Oct. 1, 1987

[30] Foreign Application Priority Data

Oct. 3, 1986 [EP] European Pat. Off. ........ 86.113669.5

[51] Int. Cl.$^4$ ............................................. H01J 37/26
[52] U.S. Cl. .................................. 250/306; 250/423 F
[58] Field of Search ..................... 250/306, 307, 423 F

[56] References Cited

U.S. PATENT DOCUMENTS 4,668,865  5/1987  Gimzenski et al. ................. 250/306
4,724,318  2/1988  Bimmig ............................... 250/307

*Primary Examiner*—Bruce C. Anderson
*Attorney, Agent, or Firm*—Jackson E. Stanland

[57] ABSTRACT

The micromechanical sensor head is designed to measure forces down to $10^{-13}$N. It comprises a common base from which a cantilever beam and a beam member extend in parallel. The cantilever beam carries a sharply pointed tip of a hard material, dielectric or not, for interaction with the surface of a sample to be investigated. Bulges forming a tunneling junction protrude from facing surfaces of said beams, the gap between said bulges being adjustable by means of electrostatic forces generated by a potential ($V_d$) applied to a pair of electrodes respectively coated onto parallel surface of said beams. The sensor head consists of one single piece of semiconductor material, such as silicon or gallium arsenide (or any other compounds thereof) which is fabricated to the dimensions required for the application by means of conventional semiconductor chip manufacturing techniques.

21 Claims, 3 Drawing Sheets

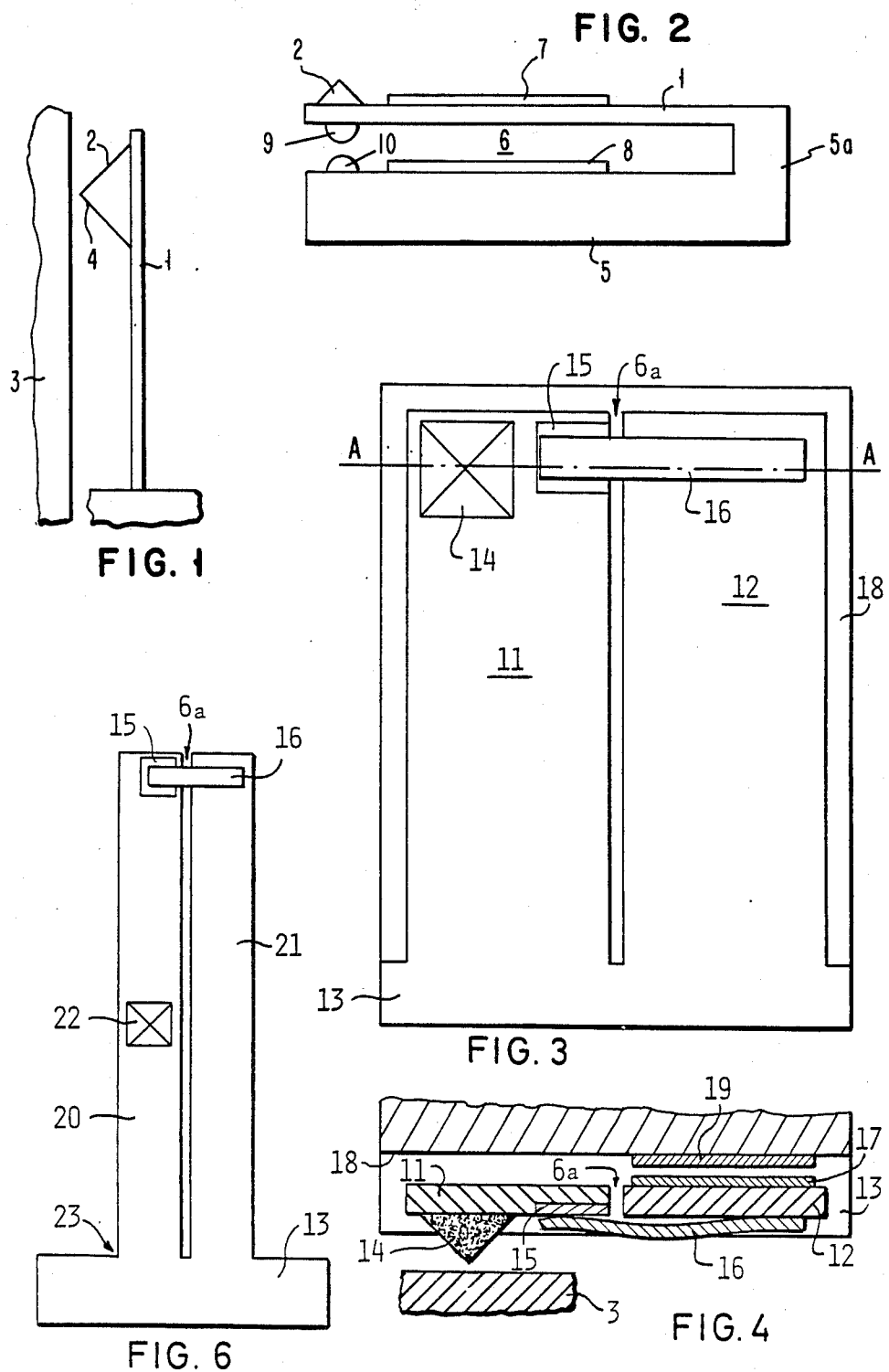

MICROMECHANICAL ATOMIC FORCE SENSOR HEAD

BACKGROUND OF THE INVENTION

Field of the Invention

This invention relates to a sensor head assembly capable of detecting forces down to a level of $10^{-12}$N (Newton) Forces of that order of magnitude may occur, for example, between individual atoms or molecules if they are brought closely together, yet without touching. The sensor head of the present invention can, therefore, find application in the Scanning Atomic Force Microscope as proposed by G. Binnig et al in 1985.

Description of the Related Art

While one embodiment of an atomic force microscope is described in copending U.S. application Ser. No. 892,977, filed Aug. 4, 1986, now U.S. Pat. No. 4,724,318 and assigned to the present assignee, a brief description of its features will enhance the understanding of the present invention to be described below. An atomic force microscope typically comprises a sharply pointed tip of a hard material mounted at the free end of an elastic cantilever beam, and a detector for sensing the deflection said cantilever beam undergoes when the tip is brought close to an atom or molecule. Since the interatomic forces occurring between the tip and the atom nextmost to the tip's apex are so small, so is the ensuing deflection of the cantilever beam.

There are several methods known in the art for detecting deflections on the order of fractions of a nanometer. It may, therefore, suffice to refer to just one of them. It is known that the tunneling current flowing across a gap between a conductor and a sharp pointed conductive tip is exponentially dependent on the width of the gap. If, therefore, the cantilever beam carries a dielectric tip and, on its face opposite from the dielectric tip it carries, is electrically conductive and a sharp metal tip is maintained at a tunneling distance from the cantilever, the variation of the tunneling current will precisely indicate the deflection the cantilever performs as its tip is confronted with the external atom or molecule. For a description of a Scanning Tunneling Microscope which makes use of this dependence of the tunneling current on the gap width, reference is made to U.S. Pat. No. 4,343,993.

From the foregoing description of an atom force microscope it will be clear to those skilled in the art that the most critical part of an atomic force microscope is the sensor head assembly comprising the cantilever beam and the dielectric tip it carries. Because this is difficult to achieve, the atomic force microscope is a very recent development there being no other beams known which can detect forces of magnitude less than $10^{-12}$N. No efforts have been reported to develop a sensor head assembly that meets the requirement of detecting forces of such small magnitude. In the embodiment described in accordance with aforementioned U.S. appln. Ser. No. 892,977, now U.S. Pat. No. 4,724,318, and also in an article entitled "Atomic Force Microscope" by G. Binnig, C. F. Quate and Ch. Gerber, Phys. Rev. Lett. Vol. 56, No. 9, 1986, pp. 930–933, the cantilever beam was a gold foil of about 25 $\mu$m thickness, 800 $\mu$m length and 250 $\mu$m width, to which a diamond tip was glued. It will be obvious to those skilled in the art that the fabrication and handling of a cantilever beam of that sort are extremely delicate and prone to low yield.

It is, therefore, one object of the present invention to propose a micromechanical atomic force sensor head which is relatively easy to manufacture and handle, and which is very inexpensive when produced in quantity. An important novel feature of the proposed atomic force sensor head is that it incorporates a cantilever beam and tunnel gap in one monolithic device.

Prior to starting a description of the details of the present invention, it may be useful to briefly explain the meaning of 'micromechanical'. Microminiaturization of electronic devices has led to a comprehensive study of many properties of the element silicon and it has ben found that, besides its advantages as a semiconductor, it has a number of mechanical characteristics which make it very useful in the design of mechanical structures. In particular, since the electronic circuits manufactured on silicon wafers require miniaturization, it has been learned how to construct mechanical silicon parts with very small dimensions using essentially the same manufacturing techniques (such as lithography, epitaxy, that have been used to make electronic circuits. Therefore, the term 'micromechanical' is used to described miniaturized mechanical structures made of silicon and its compounds.

Further information on micromechanics may be obtained from the following publications:

K. E. Peterson, Dynamic Micromechanics on Silicon: Technique and Devices, IEEE Trans. on Electron Devices Vol. ED-25, No. 10, October 1978, pp. 1241...1250;

J. B. Angell, S. C. Terry, P. W. Barth, Silicon Micromechanical Devices, Scientific American, Vol. 248, No. 4, 1983, pp. 36...47;

A. Heuberger, Mikromechanik - Der Chip lernt fuhlen, VDI Machrichten-Magazin 4/85, pp. 34–35.

SUMMARY OF THE INVENTION

The above-stated object of the present invention is achieved with a micromechanical atomic force sensor head comprising at least one cantilever beam fixed at one end and carrying a sharp point at a location distant from the fixed end thereof for interaction with the surface of a sample to be investigated. The head also includes a detection means for detecting the deflection of the cantilever beam as it interacts with the sample surface. The cantilever beam and the detection means form one integral part manufactured by known micromechanical techniques from one piece of material. The detection means extends in parallel with the cantilever beam from a common base, with a tap between the cantilever beam and the detection means. A pair of tunnel electrodes is respectively attached to facing surfaces of the cantilever beam and the detection means, the mutual distance between the pair of electrodes being adjustable by way of application of a potential to a pair of electrostatic electrodes attached to the cantilever beam and/or to said detection means and/or to a reference surface, so as to allow an initial value of the tunneling current to be set when a tunneling potential is applied to said tunneling electrodes.

These and other objects, features, and advantages will be apparent from the following more detailed description of the preferred embodiments.

BRIEF DESCRIPTION OF THE DRAWING

Details of several embodiments of the present invention will hereinafter be described by way of example with respect to the accompanying drawing in which:

FIG. 1 is a schematic representation of a cantilever beam facing the surface to be inspected.

FIG. 2 is a schematic representation of the cantilever beam as part of an integrated tunnel junction.

FIG. 3 is a front elevation of another embodiment of the cantilever beam arrangement.

FIG. 4 is a horizontal cross-section of the embodiment of FIG. 3 along line A—A.

FIG. 6 is a schematic representation of still another embodiment similar to the one of FIG. 3.

DESCRIPTION OF THE PREFERRED EMBODIMENTS

Figure 5:
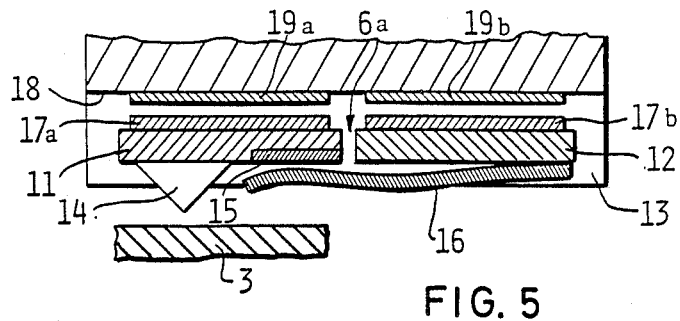
FIG. 5 is a horizontal cross section of an embodiment similar to the one of FIG. 3.

Referring to FIG. 1, there is shown a cantilever beam 1 rigidly mounted at one end and carrying a sharply pointed tip 2 at its free end. It is to be understood that in contrast to the scanning tunneling microscope where the tip had to be electrically conducting, tip 2 in FIG. 1 may consist of any solid material, conducting or nonconducting. For the purposes of this description, it may be assumed that tip 2 consists, for example, of silicon. At tip 2 is brought sufficiently close to the surface 3 of a solid body, conductive or not, the atoms both at the apex 4 of tip 2 as well as on the surface 3 develop some forces between them, having the tendency of varying the distance between tip 2 and surface 3. (Typically, that distance will be on the order of one tenth of a nanometer.)

Since cantilever beam 1 is rigidly held at one end, the interatomic forces will deflect the free end of beam 1 from its home position. It is assumed, of course, that the beam consists of a material which permits such deflection when the beam is appropriately dimensioned.

The dimensions and elastic properties of the beam have to be chosen such that the deflection is large enough for detection. The interatomic forces which one would like to be able to detect with the sensor head of the present invention have an order of magnitude of $10^{-12}$ N. Accordingly, under the assumption that a deflection y of the cantilever beam 1 by a force F through one thousandth of a nanometer from its home position is easily detectable with the tunneling contact of a known tunneling microscope, the force consnstant C* of the cantilever beam must be:

$$C^* = \frac{F}{y} = 1 \text{ Nm}^{-1}$$

Since the tunneling current changes by one order of magnitude for each one tenth of a nanometer change in tunneling gap width, the combination of cantilever beam and tunneling junction is an ideal instrument provided the cantilever beam has a high eigenfrequency so as to be insensitive to ambient vibrations. Usually, the ambient vibrations, mainly building vibrations, are on the order of < 100 Hertz. If the cantilever beam is chosen such that it has a eigenfrequency $f_o = 10$ kHz, the ambient vibrations will be attenuated to a negligible value.

The eigenfrequency $f_o$ of the cantilever beam of FIG. 1 may be written as $$f_0 = 0.162 \frac{t}{l^2} \sqrt{\frac{E}{p} K} \quad [1]$$

where E is Young's modulus of elasticity, p is the density and K a correction factor close to unity, l is the length and t is the thickness of the cantilever beam. If we select $SiO_2$ as the beam material, with $E = 7.3 \times 10^{10} \text{Nm}^{-2}$, $p = 2.5 \times 10^3 \text{kg m}^{-3}$, for $f_o = 10$ kHz, Equation (1) will yield $t/l^2 = 11.6$ m$^{01}$.

Of course, the sensitivity of the cantilever beam is also dependent on its dimensions and on the material of which it consists, in accordance with the term $$C^* = \frac{F}{y} = \frac{Ewt^3}{4l^3}. \quad [2]$$

Clearly, the highest sensitivity is obtained for long, thin and narrow beams. Constructing a beam with a thickness of about 1 μm is feasible in micromechanical technology. The width of the beam should be sufficiently large that lateral vibrations are suppressed. Also, the width of the beam optionally should permit the fabrication of additional structures thereon. A minimum width $w \simeq 10$ μm seems reasonable. Substituting all available values for this example into Equation (1), one obtains a cantilever beam length $l \simeq 300$ μm and a spring constant $C^* = 7.2 \times 10^{-3}$ Nm$^{-1}$. In practice, however C* must be of the order of 1 Nm$^{-1}$ in order to avoid instabilities during sensing of attractice forces and to prevent excessive thermal vibrations of the beam. Dimensions of a beam compatible with $C^* = 1$ Nm$^{-1}$, and $f_o = 10$ kHZ are: $l \simeq 800$ μm, $w \simeq 75$ μm ∧ :f.t$\simeq 7.5$ μm.

Having established that forces on the order of $10^{-12}$ N can be detected in the normal deflection mode of the cantilever beam, the sensitivity of the sensor head in accordance with the present invention can be further enhanced by vibrating the object to be investigated at the eigenfrequency $f_o$ of the cantilever beam, as described by Binnig et al in Phys. Rev. Lett. Vol. 56, No. 9 (1986) pp. 930-933.

The enhancement is $A = \frac{1}{2}\xi$, where $\xi$ is the damping factor of the beam. For a beam having a quality factor $Q = 10$, C* may be on the order of 1.6 Nm$^{-1}$ for $\xi = 10^{-2}$. The sensitivity then goes up to $10^{-13}$ N.

The micromechanical technique permits the combination of the cantilever beam with a distance regulated metal-vacuum-metal tunnel junction. FIG. 2 shows the arrangement. Cantilever beam 1 is made an integral part of a horseshoe-like element which further includes a base 5, with a gap 6 of the width $d_o$ between cantilever beam 1 and base 5. Cantilever 1 and base 5 extend in parallel from a common back 5a. It is to be noted that the entire assembly is produced by lithographic techniques and, therefore, forms a monolithic structure of extreme mechanical stability.

Cantilever beam 1 can be deflected conveniently by electrostatic means. To this end, base 5 as well as cantilever beam 1 carry gold electrodes 7 and 8, respectively. A potential $V_d$ applied between electrodes 7 and 8 will cause cantilever beam 1 to deflect (assuming the base 5, being bigger in cross-section, will not noticeably deflect) and, thus, change the distance between cantilever beam 1 and base 5.

The necessary width of gap 6 between cantilever beam 1 and base 5 can be adjusted by deflecting cantilever beam 1. The deflection delta determines, of course, the maximum voltage which can be applied without breakdown. The deflection delta of the cantilever beam depends on the material from which it is manufactured, in accordance with the term:

$$\delta = \tfrac{3}{4} \frac{E}{\epsilon_0} \frac{t^4}{l^3 d_0^2} V^2 \qquad [3]$$

wherein $\epsilon_0$ is the dielectric constant, E is Young's modulus of elasticity, and V is the applied voltage. The length $l \approx 800$ μm and the thickness $t = 7.3$ μm have already been determined from other requirements.

With $\epsilon_0 = 8.854 \times 10^{-12}$ Fm$^{-1}$, $l = 800$ μm, $t = 7.3$ μm and $E = 7.3 \times 10^{10}$ Nm$^{-2}$, Equation (3) yields:

$$\delta \approx 9.5 \times 10^{-20} \frac{V^2}{d_0^2} \qquad [4]$$

For cantilever beams having the dimensions derived above, and with a gap width of 25 μm, a potential of 30 V appears appropriate. Equation (4) then yields $\delta = 0.14$ μm.

For comparison, with a cantilever beam of $l = 1$ mm, $w = 0.1$ mm and $t = 0.01$ mm, similar values for the deflection $\delta$ and for the resonance frequency $f_o$ will be obtained, viz. $\delta = 0.13$ μm and $f_o = 8.8$ kHz.

As indicated in FIG. 2, cantilever beam 1 and base 5 each carry a conductive (metallic) bulge 9 and 10, respectively at their free ends, bulges 9 and 20 facing one another at a distance of about 100 nm when the assembly is in a non-operative state. Through the application of a potential between electrodes 7 and 8, the distance between bulges 9 and 10 can be reduced to 0.5-1 nanometer. At this distance, and with the appropriate potential applied across the gap between bulges 9 and 10, a tunneling current will flow which can be stabilized and controlled the same as in a scanning tunneling microscope.

It should be noted that, although the arrangement with bulges 9 and 10 is in fact making use of the tunnel effect as in the scanning tunneling microscope, for the present application of the tunnel effect no sharply pointed tip is required. Accordingly, bulges 9 and 10 have a rounded surface with a relatively large radius. Actually, bulges 9 and 10, when having a distance there between on the order of one nanometer, form a tunnel junction.

FIGS. 3 and 4 show another embodiment of a micromechanical sensor head in accordance with the present invention. FIG. 3 is a front elevation, whereas FIG. 4 is a cross-section along line A—A in FIG. 3. Two cantilever beams 11 and 12 extend in parallel from a common base 13, with a small gap 6a between them, the width of the gap not being material to the principle of operation. One of the cantilever beams (11) carries a pointed tip 14 for interacting with the surface of the sample to be investigated.

The tip-carrying beam 11 also carries a metallized pad 15 which cooperates with a tongue 16 fixed at the free end of the other cantilever beam 12. The arrangement of FIG. 3 is manufactured such that the distance between pad 15 and tongue 16, in the non-operative state is about 100 nm. One of the cantilever beams, say beam 12, for example, carries a metallic coating 17 on the side opposite the pad 15/tongue 16 arrangement, and a fixed wall 18—in front of which the cantilever beams are positioned—carries a corresponding metallic coating 19. An electrical potential applied at these coatings 17 and 19 will cause cantilever beam 12 to deflect and can, therefore, be employed to control the distance between pad 15 and tongue 16. In operation of the device of FIGS. 3 and 4, that distance will be controlled to be 0.5-1 nm.

FIG. 5 shows a variation of the embodiment of FIG. 4 with both cantilever beams 11 and 12 carrying metallic coatings 17a and 17b, respectively. Corresponding counterelectrodes 19a and 19b are attached to wall 18. Obviously, this arrangement permits the control of the distance between tip 14 and the surface of the sample 3 to be investigated, through the application of a potential to electrodes 17a and 19a, as well as the adjustment of the tunneling gap between pad 15 and tongue 16.

FIG. 6 shows the same embodiment as FIGS. 3 and 4 but slightly modified. Cantilever beams 20 and 21 have double the length, for example, of beams 11 and 12, yet the position of tip 22 with respect to the footpoint 23 of the beams is the same as for tip 14 in FIG. 3. Obviously, as beam 20 is deflected by the force acting upon tip 22, the deflection gets transformed into a greater amount in accordance with the geometric situation. It will be clear to those skilled in the art that the sensitivity of the device is accordingly increased.

Figure 7:
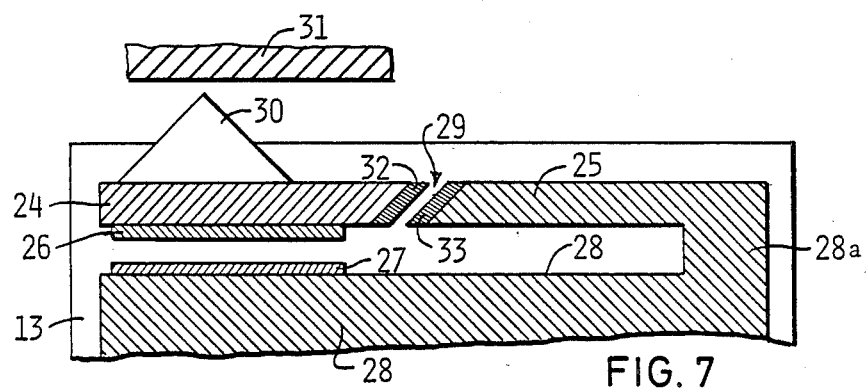
FIG. 7 is a cross-section of still another embodiment of the invention.

A further embodiment of the invention is shown in FIG. 7 which is a horizontal cross-section through a pair of cantilever beams 24 and 25 spaced by a gap 29. One of the cantilever beams may be mounted rigidly, e.g. beam 25, whereas the other cantilever beam 24 is arranged for bending caused by electrostatic forces applied at electrodes 26 and 27 respectively coated onto facing surfaces of cantilever beam 24 and of a fixed wall 28.

The gap 29 between cantilever beams 24 and 25 is oblique or inclined, at an angle of 45°, for example. The width of gap 29 is controlled to be within tunneling distance by the potential applied to electrodes 26 and 27 respectively attached to facing wedge surfaces of cantilever beams 24 and 25. At constant width of gap 29, a constant tunneling current will flow across that gap.

As tip 30 is brought close to the surface 31 to be investigated, cantilever beam 24 is bent by the forces occurring between the atoms at the apex of tip 30 and at surface 31, respectively, and the width of gap 29 is correspondingly altered. This results in a corresponding change of the tunneling current to be used for force sensing in the way described above.

Figure 8:
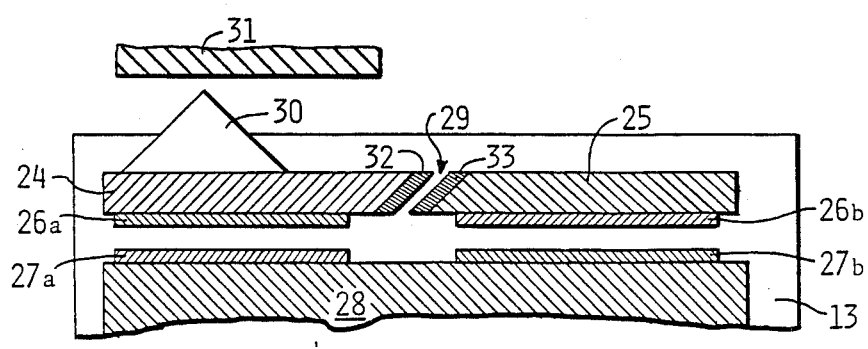
FIG. 8 is a cross-section of a modification of the embodiment of FIG. 7.

In a similar, favorable arrangement shown in FIG. 8, beams 24 and 25 are both designed to be deflectable, and both carry electrodes 26a and 26b, respectively. Corresponding electrodes 27a and 27b are attached to wall 28. The application of a potential to electrodes 26a and 27a permits the adjustment of the gap between tip 30 and the surface of sample 31, whereas the application of a potential to electrodes 26b and 27b allows the control of the width of tunneling gap 29.

Those skilled in the tunneling microscope art will remember that a feedback signal derived from the deviation of the tunneling current from an initial or predetermined value can be used to control the distance either between the surface to be investigated and the investigating tip, or between the deflected cantilever beam and a tunneling electrode, so as to minimize the deviation of the tunneling current from its initial value. The feedback signal is plotted against position information relative to the current location of the investigating tip with respect to the surface of the sample. This principle is, of course, applicable also to the micromechanical atomic force sensor head of the present invention.

Figure 9:
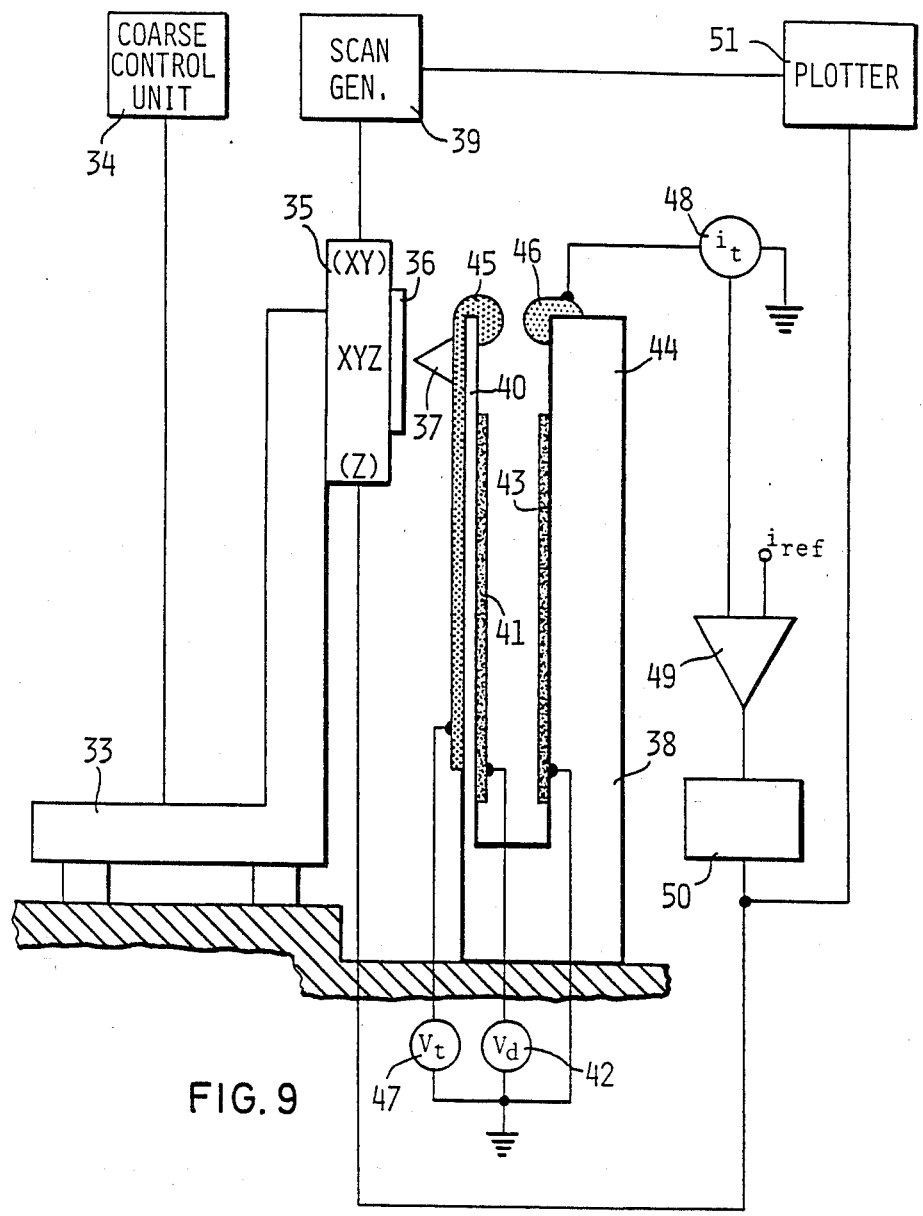
FIG. 9 is a schematic circuit diagram showing the connection of the atomic force sensor head to the electronics controlling a plotter.

FIG. 9 shows an embodiment of an atomic force microscope employing the atomic force sensor head of the present invention. Mounted on a corse-approach positioning device 33 (for example the one disclosed in U.S. Pat. No. 4,422,002) which is controlled by a control unit 34 is a conventional piezoelectric xyz-drive 35 that permits the sample 36 to be raster-scanned with respect to the tip 37 of the sensor head 38. xyz-drive 35 is activated by a scan generator 39.

As previously mentioned, cantilever beam 40 carries a conductive coating 41 which is connected to a source 42 of a controllable deflection voltage $V_d$. Grounded metallization 43 coated on a beam member 44 is used as the counterelectrode for deflecting cantilever beam 40 such that, in operation, the distance between the bulges 45 and 46 at cantilever beam 40 and beam member 44, respectively, can be electrostatically adjusted to a value of about one nanometer. Bulge 45 is connected to a source 47 of tunneling voltage $V_t$, while bulge 46 is connected to a tunneling current detector 48 which in turn is connected to one input terminal of a differential amplifier 49 the other terminal of which is supplied with a reference current $i_{ref}$. The output signal of differential amplifier 49 is passed through an integrator 50 and controls a plotter 51 for recording the measured variations of the tunneling current against the position information which plotter 51 receives from scan generator 39. The output signal of integrator 50 is further supplied to the z-section of xyz-drive 35.

In operation, the distance between bulges 45 and 46 is adjusted by applying an appropriate deflection voltage $V_d$ so that a predetermined tunneling current flows. Next tip 37 is brought to within about 100 nm from sample 36 by means of coarse-approach positioning device 33. That distance is then fine-adjusted so that the interaction force between tip 37 and sample 36 reaches a predetermined value, said force being sensed by a change in tunneling current resulting from the deflection of beam 40 in response to the force.

Scan generator 39 is now started and causes mutual displacement within an x/y matrix between sample 36 and tip 37. As an asperity or hole on the surface of sample 36 is encountered during scanning, the force situation at tip 37 changes, causing cantilever beam 40 to assume a new position. This in turn results in an alteration of the distance between bulges 45 and 46 and, hence, in a deviation of the tunneling current from its predetermined value. This deviation is used to generate a feedback signal which is used to control the z-section of xyz-drive 35 to re-establish the distance between sample 36 and tip 37 to its previous value and, at the same time, this feedback signal is plotted by plotter 52 giving a true image of the surface of sample 36 at the current location of tip 37.

While the invention has been described with respect to selected embodiments thereof, it will be apparent to those of skill in the art that variations can be made thereto without departing from the spirit and scope of the present invention. For example, the micromechanical atomic force sensor head can be comprised of multiple cantilever structure where one, two, or more separate cantilever portions are provided, the cantilever portions being part of a unitary micromechanical structure. This structure can be comprised of a machined single piece of material, such as silicon, a compound of silicon, GaAs, etc.

Having thus described our invention, what we claim as new and desire to secure by Letters Patent is:

1. A micromechanical atomic force sensor head comprising at least one cantilever beam fixed at one end and carrying a sharp point at a location distant from said fixed end for interaction with a surface of a sample to be investigated, and detection means for detecting the deflection of said cantilever beam as it interacts with said investigated surface, said cantilever beam and said detection means forming one integral part micromechanically manufactured from one piece of material.

said detection means extending in parallel with said cantilever beam from a common base, there being a gap between said cantilever beam and said detection means, a pair of tunnel electrodes attached to facing surfaces of said cantilever beam and said detection means, the distance between said tunnel electrodes being adjustable, and a pair of electrostatic electrodes across which a potential is applied to adjust the distance between said electrostatic electrodes, said electrostatic electrodes being located with respect to said cantilever beam and said detection means that a potential applied across said electrostatic electrodes varies said adjustable distance between said tunneling electrodes thereby adjusting the tunnel current there between.

2. The sensor head of claim 1, wherein said detection means is a rigid beam which extends from said base in parallel with said cantilever beam, there being a gap there between, said pair of tunnel electrodes protruding from said cantilever beam and said rigid beam into said gap, said pair of electrostatic electrodes being mutually aligned deflection electrodes located on said cantilever beam and said rigid beam.

3. The sensor head of claim 1, wherein said detection means is a flexible beam extending in parallel with said cantilever beam from said common base, there being a gap between said beams.

a tunneling junction formed by a conductive first electrode located at the free end of said cantilever beam and a second electrode extending from said flexible beam and aligned with said first electrode, the distance between said first and second tunnel electrodes being adjustable by means of an electrostatic field applied between said pair of electrostatic electrodes.

4. The sensor head of claim 3, wherein said sharp point is located on said cantilever beam at the free end thereof in juxtaposition with said tunneling junction.

5. The sensor head of claim 3, wherein said sharp point is located on said cantilever beam about half way between the fixed end of said cantilever beam and said tunneling junction.

6. The sensor head of claim 1, wherein said detection means is a flexible beam extending in parallel with said cantilever beam from said common base, there being a gap between said beams, tunneling junction formed by a conductive first electrode located at the free end of said cantilever beam and a second electrode extending from said flexible beam and aligned with said first electrode, the distance between said first and second tunnel electrodes being adjustable by means of a first electrostatical field applied between a first pair of electrodes disposed respectively on facing surfaces of said cantilever beam and a fixed wall, and a second electrostatical field applied between a second pair of electrodes disposed respectively on facing surfaces of said flexible beam and said fixed wall, said wall being attached to said common base.

7. The sensor head of claim 1, wherein said detection means includes a rigid beam fixed to a wall and extending from a common base in parallel with said cantilever beam, there being an oblique gap between said beams, said tunneling junction being formed by said pair of tunnel electrodes which are respectively attached to oblique facing shoulders of said beams, said cantilever beam and said wall carrying mutually facing electrostatic electrodes for adjusting the width of the tunneling gap of said tunneling junction through the application of a deflection potential to said electrostatic electrodes.

8. The sensor head of claim 1, wherein said detection means includes a flexible beam extending in parallel with said cantilever beam from said common base there being an oblique gap between said beams, a tunneling junction formed by said pair of tunnel electrodes which are respectively attached to oblique, facing shoulders of said beams, each of said beams carrying an electrostatic deflection electrode on their sides facing a fixed wall extending from said common base and carrying a pair of counterelectrodes respectively aligned with said electrostatic deflection electrodes.

9. A micromechanical atomic force sensor head for examining the surface of a sample including:
at least one cantilever beam of such dimensions and material that atomic forces existing between atoms and molecules are sufficient to deflect said cantilever beam, said cantilever beam having a free end and a fixed end and including a pointed tip located along said beam and spaced from said fixed end, said pointed tip being held in close proximity to said surface to be examined, the atomic forces existing between said pointed tip and said surface causing said cantilever beam to be deflected,
detection means for detecting the deflection of said cantilever beam when atomic forces exist between said surface and said pointed tip, said detection means and said cantilever beam forming an integral structure micromachined from a single piece of material, said detection means and said cantilever beam being spaced from one another by a gap, said detection means including a tunnel junction formed between two tunnel electrodes, at least one of which is located such that a deflection of said cantilever beam will move said at least one electrode,
means for producing a tunnel current in said tunnel junction, and
means for adjusting the spacing between said two tunnel electrodes to thereby adjust the magnitude of said tunnel current, said means for adjusting including at least two electrostatic deflection electrodes across which a potential is applied for varying the distance between said two deflection electrodes, said deflection electrodes being located with respect to said cantilever beam that the spacing between said tunnel electrodes is adjustable depending on the magnitude of the potential applied between said deflecting electrodes.

10. The sensor head of claim 9, where said cantilever beam and said detection means are comprised of a material selected from the group consisting of silicon, compounds continuing silicon, and GaAs.

11. The sensor head of claim 9, where said at least one tunnel electrode is located on said cantilever beam.

12. The sensor head of claim 11, where the other said tunnel electrode is located on said detection means.

13. The sensor head of claim 12, where said means for adjusting is connected to said detection means, and moves said detection means when said potential is applied.

14. The sensor head of claim 12, where said means for adjusting is connected to said cantilever beam and moves said cantilever beam when said potential is applied.

15. The sensor head of claim 9, where said detection means includes a beam separated from said cantilever beam, one of said two tunnel electrodes being located on said cantilever beam and the other tunnel electrode being located on said beam separated from said cantilever beam.

16. The sensor head of claim 15, where at least one of said deflection electrodes is located on said cantilever beam.

17. The sensor head of claim 15, where at least one of said deflection electrodes is located on said beam separated from said cantilever beam.

18. The sensor head of claim 15, where said cantilever beam and said beam separated from said cantilever beam extend generally parallel to one another from a common, integral base.

19. The sensor head of claim 18 where said beam separated from said cantilever beam is flexible.

20. The sensor head of claim 18, where said beam separated from said cantilever beam is rigid.

21. The sensor head of claim 18, where said integral structure is comprised of silicon

* * * * *